INTEGRATED DIPOLE ANTENNA-AMPLIFIER

Original Filed March 15, 1965 3 Sheets-Sheet 1

INVENTOR
Carlton H. Walter
Kiyohei Fujimoto
BY
Anthony D. Cennamo

INTEGRATED DIPOLE ANTENNA-AMPLIFIER

INVENTOR
Carlton H. Walter
Kyohei Fujimoto
BY Anthony D. Cennamo

Feb. 17, 1970 C. H. WALTER ET AL 3,496,566

INTEGRATED DIPOLE ANTENNA-AMPLIFIER

Original Filed March 15, 1965 3 Sheets-Sheet 3

INVENTOR.
Carlton H. Walter
BY Kyohei Fujimoto
Anthony D. Cennamo

United States Patent Office 3,496,566
Patented Feb. 17, 1970

3,496,566

INTEGRATED DIPOLE ANTENNA-AMPLIFIER

Carlton H. Walter, Columbus, Ohio, and Kyohei Fujimoto, Yokohama, Japan, assignors to The Ohio State University Research Foundation Continuation of application Ser. No. 449,910, Mar. 15, 1965. This application Nov. 12, 1968, Ser. No. 775,589
Int. Cl. H01q 1/26
U.S. Cl. 343—701 7 Claims

ABSTRACT OF THE DISCLOSURE

This invention relates to an antenna having integrated therein the circuitry with which it is intended to function. The antenna performs one or more circuit functions with no sharp division to isolate the antenna terminals from the circuit terminals thereby eliminating the usual matching and tuning elements between the antenna and its circuitry. Specifically, the antenna comprises a coaxial type of dipole antenna and transmission line with a tunnel diode amplifier inserted between the two poles of the antenna.

This is a continuation of application Ser. No. 449,910, filed Mar. 15, 1965.

BACKGROUND

The compactness required by commercial electronics is making mandatory the utmost economy of space in packaging of electronic systems. This compactness must not be a sacrifice on its operability and must maintain the highest possible operation efficiencies. Similarly, compactness of design as a manufacturing cost factor and improved operation is always of importance in the developments of commercial electronic products.

Until recently, the electronic components, such as vacuum tubes, capacitors and other circuitry were bulky and cumbersome. Despite every effort for neatness and efficiency, conventional items, such as electronic receivers and transmitters, maintained relatively large space requirements. In addition to a loss of space, these bulky components used in the conventional receivers and transmitters lowered considerably the efficiency of the operation of the system. Further, when electronic systems in higher frequency ranges are considered, efficiency requirements become even more stringent and consequently the inefficiency of the conventional components increased.

In the last decade or so, there has been a continual development of parameters leading towards effective miniaturization. The most important being the printed circuit and, more recently, solid state devices such as the transistor and the tunnel diode. These elements not only permit miniaturization, but are relatively inexpensive, compact, long-lasting, and more reliable than even the most expensive prior used components.

Despite these developments in the components, per se, there continues to be the lack of unification. This is especially apparent where the actual transmitting or receiving apparatus is remoted from the antenna. Generally, even though a neat package of miniature components may be assembled, and even in the "solid state circuits," the transmission of the signals in the conventional manner from one circuit to the next tends to defeat the intended result. The problem, of course, becomes more severe as the operating frequency is increased.

In the co-pending application, Ser. No. 34,095, filed June 6, 1960, now Patent No. 3,296,536 for "Antenna System" a converter circuit is incorporated directly in the tip, or at the point of signal origin, of the antenna. With that arrangement, there is provided an antenna system that is broadband, has instant frequency conversion, and high signal-to-noise ratio, together with certain physical advantages.

In a patent issued to A. F. Wickersham, Jr., et al., No. 3,098,973, there is shown a dipole antenna having a tunnel diode amplifier integrated therein. Although this antenna is directed towards unification, it does not offer the complete answer. The antenna shown is limited in gain, would tend to oscillate even at low grains may be overloaded easily, and of most importance, does not provide for impedance matching control. It is purported to eliminate the impedance problems but to the most would only minimize the matching of the antenna to the amplifier. The line matching problem remains. Further, in certain instances, to achieve stability, it may be necessary to purposely mismatch a certain amount; hence there is a need for controlled impedance matching.

SUMMARY OF INVENTION

In the present invention, there is employed the concept of integrating the design of an antenna with the circuitry with which it is intended to function. This combination is capable of providing improved system performance from fewer components in more compact form than the mere conventional approach of separated design. In the truly integrated design of an embodiment, the antenna structure performs one or more circuit functions, as well as its antenna function, and as a result, no sharp division is made which isolates antenna terminals from circuit terminals. This duplication of functions in the antenna provides for the elimination of the usual matching and tuning elements between an antenna and its circuitry. In addition to the solid state amplifier, there is further provided a matching section for matching the antenna to the transmission line.

OBJECTS

Accordingly, it is a principal object of the present invention to provide a new and improved integrated and unified antenna system.

Another object of the present invention is to provide an integrated and unified antenna system with an efficiency not obtainable through conventional techniques and packaging, that is simple, stable, compact and relatively inexpensive.

A further object of the present invention is to provide an antenna system and radio frequency amplifier that is stable, has a low noise potential and with controlled gain.

Still another object of the present invention is to integrate a radio frequency amplifier system using the newly developed solid state components in an antenna system that permits their maximum efficiency without attendant losses normally encountered with conventional components.

Other objects and features of the invention will become apparent from a reading of the following description together with the drawings in which:

FIGURE 1*a* is a $\pi$-match dipole;

FIGURE 1*b* is a double-H antenna;

FIGURE 1*c* is an equivalent electrical circuit of the schematic antenna of FIGURES 1*a* and 1*b*;

FIGURE 2 illustrates a first embodiment in schematic form of a loaded $\pi$-match dipole antenna where $Z_d$ represents the solid state circuit;

FIGURE 2*a* illustrates a second embodiment in schematic form of a loaded $\pi$-match dipole antenna where $Z_d$ represents the solid state circuit;

FIGURE 2*b* illustrates a third embodiment in schematic form of a loaded $\pi$-match dipole antenna where $Z_d$ represents the solid-state circuit;

FIGURE 2*c* illustrates a fourth embodiment in schematic form of a loaded $\pi$-match dipole antenna where $Z_d$ represents the solid-state circuit;

Figure 10A:
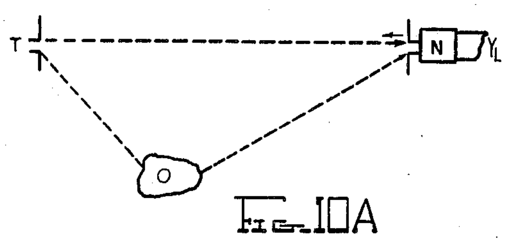
Figure 10B:
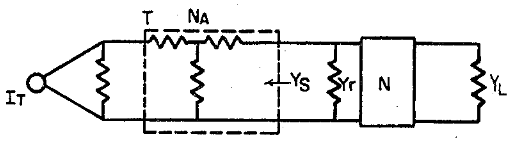

FIGURE 10*a* is a schematic representation of the transmitter antenna and the receiver antenna-amplifier;

FIGURE 10*b* is representative network structure of the schematic representative of FIGURE 10*a*.

Figure 12:
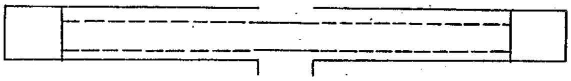
Figure 12A:
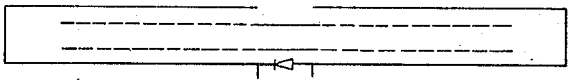
Figure 12B:
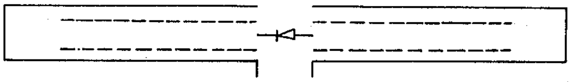
Figure 12C:
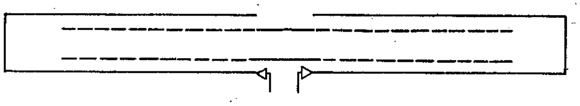
Figure 12D:
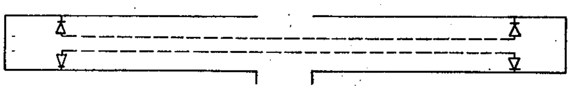
Figure 11:
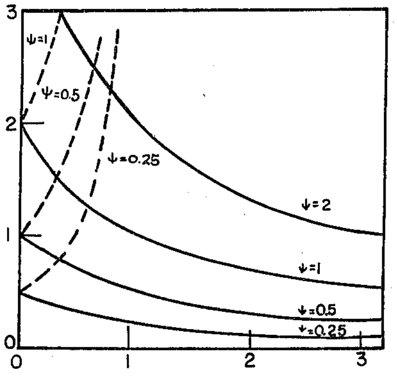

FIGURE 11 is a graphical representation of sensitivity of gain to the variations in antenna conductance and tunnel diode negative conductance;

FIGURE 12 is a first example of practical models of the antenna-amplifier of the present invention;

FIGURE 12*a* is a second example of practical models of the antenna-amplifier of the present invention;

FIGURE 12*b* is a third example of practical models of the antenna-amplifier of the present invention;

FIGURE 12*c* is a fourth example of practical models of the antenna-amplifier of the present invention;

FIGURE 12*d* is an example of a practical model of the invention; and

Figures 13, 13A:
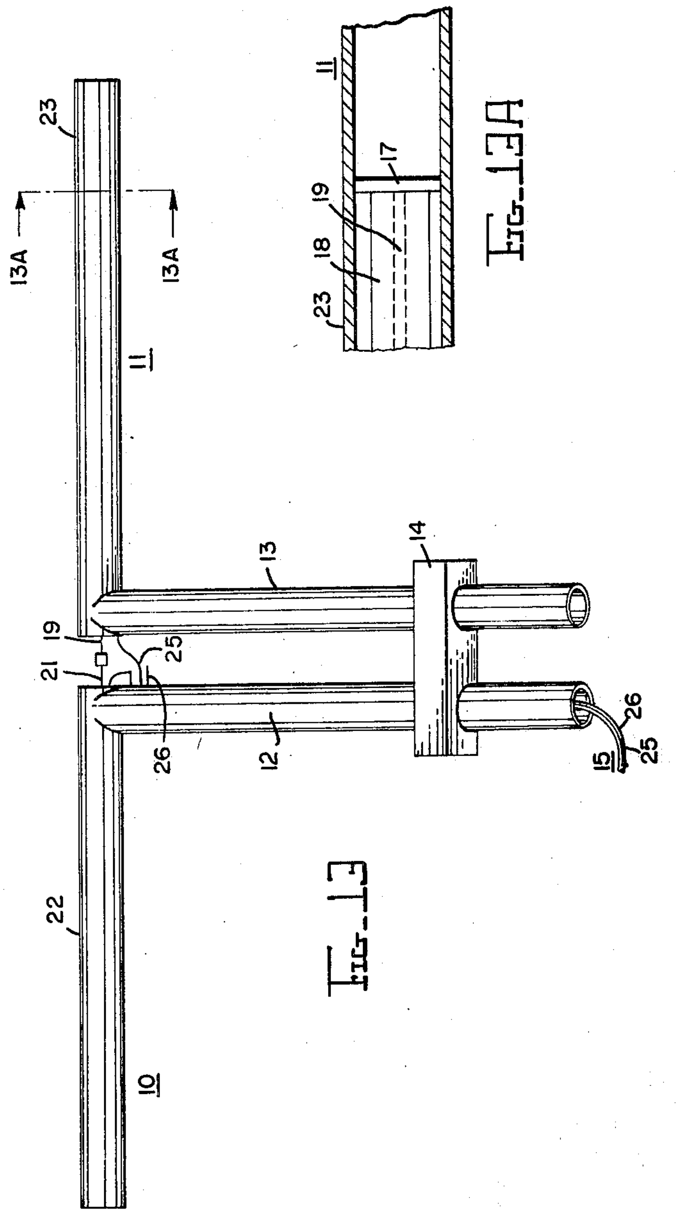

FIGURE 13 is a structural illustration of an antenna-amplifier built in accordance with the present invention; and, FIGURE 13*a* is a cross-sectional view of FIGURE 13 taken at the arrows shown on FIGURE 13.

DETAILED DESCRIPTION OF DRAWINGS AND INVENTION

The present invention is described specifically as a tunnel-diode-loaded-dipole antenna, having as the important feature the intergration of antenna and receiving circuit. The conventional antenna concept is extended to a broader concept in which the integrated system may be active, non-linear, non-reciprocal, and time variable. As a consequence, the physical configurations of the antenna and system, such as size and weight, may be reduced. Over-all performance of antenna and system, such as gain, noise figure and stability, may be improved, and applications of antenna systems are expanded. The integration generally improves reliability, economy, compactness and electrical performance of the over-all system.

To make integration feasible in practice, $\pi$-match and double-H antennas, which are modified dipoles, have been used; $\pi$-match elements aid in matching and permit optimum placement of the tunnel diode in the antenna.

An analysis is made by using an equivalent network, which is derived from decomposition of currents and voltages induced by the incident electromagnetic field on the antenna. With the equivalent network, antenna-amplifier properties may be obtained by applying ordinary network theory. A significant difference of the antenna-amplifier from the usual amplifier is that the antenna-amplifier responds to an incident field, so that field effects, such as field strength, reflection, coupling and reradiation, should be included in the analysis.

Figure 1A:
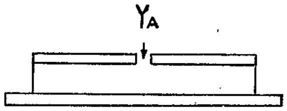
Figure 1B:
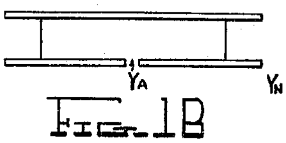
Figure 1C:
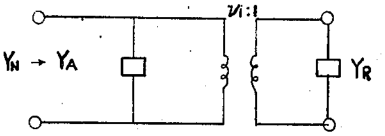
Figure 3:
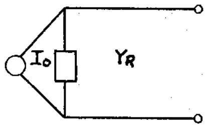
FIGURE 3 is an equivalent current representation of a dipole antenna.

In principle, the $\pi$-match dipole antenna can be decomposed into two parts, a radiation component and a non-radiation component. The radiation component is represented by an equivalent dipole and the non-radiation components is represented by an equivalent transmission line. FIGURE 1*a* shows a $\pi$-match, FIGURE 1*b* a double-H version of the $\pi$-match dipole antenna and FIGURE 1*c* an equivalent network. The input admittance $Y_A$ of the $\pi$-match dipole is expressed by the sum of the non-radiation component $Y_n$ and radiation component $Y_r = \nu_1 Y_{R7}$ where $\mu Y_R$ is the admittance of the equivalent dipole and $\nu_1$ is a current division factor which is determined by the antenna configuration. A dipole may be represented by an equivalent generator having current source $I_o$, which is proportional to the incident electromagnetic field strength, and internal admittance $Y_R$ (FIGURE 3). The current $I_o$ is understood to be the current at the midpoint of the antenna which flows through the antenna element when the midpoint is shorted. Thus combining the equivalent generator with the other components, the equivalent network of the $\pi$-match dipole can be found.

Figure 2:
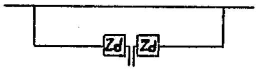
Figure 2B:
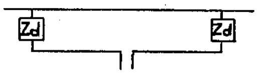
Figure 2C:
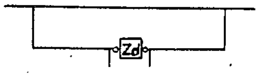
Figure 2A:
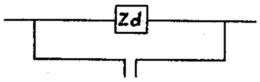
Figure 4:
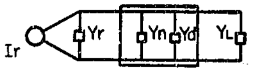
FIGURE 4 is an equivalent network of the loaded dipole antenna shown in FIGURE 2*a*.

By the same principle, the loaded dipoles of FIGURE 2 can be divided into a radiation component and non-radiation component and expressed by a combination of the equivalent generator and equivalent circuits of the tunnel diode and the antenna. As an example, a general equivalent circuit of the loaded dipole shown in FIGURE 2*c* is given in FIGURE 4, where $$I_r = \nu_1 I_o$$

The gain of the antenna-amplifier is defined as a measure of power increase at the load due to the addition of the amplifier, that is $$g = P_L / P_{Lo} \quad (1)$$

where $P_L$ is the power absorbed by the load of the antenna-amplifier and $P_{Lo}$ is the power absorbed by the load of the reference antenna (the same antenna without amplifier). As an amplifier the primary interest is to obtain a gain as large as possible within a specified bandwidth. For considering maximum gain the power transfer through the network becomes of interest; therefore the form of Equation 1 is changed to a ratio of transducer gain of the antenna-amplifier to that of a reference antenna, that is, $$g_T = \frac{P_L / P_{av}}{P_{Lo} / P_{av}} \quad (2)$$

where $P_{av}$ is the maximum power available from the source. This is further rewritten as $$gT = P_L / P_{av} \quad (3)$$

when the reference antenna is matched to the load, i.e., $P_{Lo} = P_{av}$.

Hence, in a practical design, it is convenient to discuss the gain of an antenna-amplifier in terms of transducer gain, unless the relative gain, i.e., insertion gain, is desired.

Figure 5:
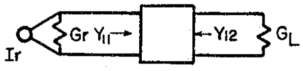
FIGURE 5 is a general antenna-amplifier network.

The transducer gain of an antenna-amplifier is obtained by using general network parameters of FIGURE 5, giving, $$g_T = \frac{4 G_r G_L}{|G_r X + Y|^2} \quad (4)$$

where $$N = \begin{bmatrix} ab \\ cd \end{bmatrix}$$
$$Y_r = G_r + {}_jB_r$$
$$Y_L = G_L + {}_jB_L$$
$$X = a + {}_bG_L$$
$$Y = c + {}_dG_L$$
$$Y_{i_1} = Y/X \text{ (input admittance of the network)} \quad (5)$$

and ${}_jB_r$ and ${}_jB_L$ are included in the network.

The network parameters can be found by substitution of the circuit parameters. For example, for the network shown in FIGURE 4, those are given as follows:

$$a = 1$$
$$b = 0$$
$$c = {}_jB_r + Y_n + Y_d + {}_jB_L \quad (6)$$

and $$d=1$$

Thus gain can be calculated by Equation 4.

The reflection coefficient $\gamma_i$ at the input port of the equivalent network is expressed by $$\gamma_i=\frac{G_r-Y_{i_1}}{G_r+Y_{i_1}} \quad (7)$$

Combining Equations 4, 5, and 7, we have $$g_T=\frac{G_L}{Re(XY^*)}(1-|\gamma_i|^2) \quad (8)$$

where * denotes complex conjugate. It is evident that to obtain the maximum gain, $\gamma_i$ must be minimized. When $Y_{i_1}$ has negative real value, i.e., $Re(Y_{i_1})<0$, Equations 4 and 7 are changed to $$g_T=\frac{4G_rG_L}{|G_rX^*-Y^*|^2} \quad (9)$$

and $$\gamma_{i-}=\frac{G_r+Y_{i_1}^*}{G_r-Y_{i_1}^*} \quad (10)$$

where the subscript—designates the case where $$Re(Y_{i_1})<0$$

Thus, from Equations 9 and 10, we get $$g_T=\frac{G_L}{Re(XY^*)}(|\gamma_{i-}|^2-1) \quad (11)$$

where $$|\gamma_{i-}|>l$$

In both cases the denominator function in Equations 4 and 9 should not have a solution for real frequencies in order to maintain stable performance (cf. Eq. 15).

It can be shown that (1), when $Re(Y_{i_1})>0$, the maximum gain takes place where $\gamma_i$ is minimum and (2), when $Re(Y_{i_1})<0$, transducer gain can be high even when $\gamma_i$ is not small. The first condition means that the input port should be matched to obtain maximum gain, as is well known. However, in an antenna-amplifier system matching at the input port cannot always be fulfilled. The reason for this is that since the input port is interpreted as the output of the equivalent dipole or the input of the equivalent network, as can be seen in FIGURE 5, this port may not be easily accessible because of the integrated structure. Since the reflection at this port gives rise to reradiation through the antenna elements, the only way to find the reflection coefficient at the input port of the network would be the measurement of the reradiation of the antenna.

For the second condition $|\gamma l-|$ is larger than unity and the reradiation may become so large in magnitude that it may not be neglected. Therefore, in a practical design, reradiation should be taken into account as well as the gain. The reradiation may be utilized for the control of the echo area of the antenna and the reradiation problem will be discussed in a later section.

Figure 6:
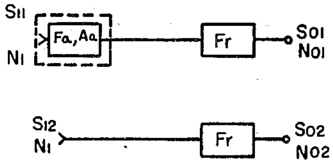
FIGURE 6 is a block diagram representation used in determining the nose figure of the antenna-amplifier.

It has been shown that the noise performance of the antenna-amplifier may be evaluated by measurement of an improvement factor R or field strength sensitivity ratio[5]. The improvement factor R is defined as the ratio of the input signal to noise ratios of the systems shown in FIGURE 6 comprising the antenna-amplifier 10 and receiver 12. In terms of R, the antenna-amplifier noise figure $F_a$ is expressed by $$F_a=\frac{R}{\zeta}\left\{\left(\frac{T_e}{T_o}\right)+(F_r-1)(1-\eta)\right\}-\left(\frac{T_e}{T_o}-1\right) \quad (12)$$

where the quantities are defined as $S_{ij}$—Input Signal Power $(j=1, 2)$
$N_i$—Input Noise Power $(=kT_oB)$
$S_{oj}$—Output Signal Power
$N_{oj}$—Output Noise Power
$F_r$—Noise Figure of the Receiver $F_a$—Noise Figure of the Antenna-amplifier
$A_a$—Gain of the Antenna-amplifier
$T_e$—Equivalent Noise Temperature
$T_o$—Standard Noise Temperature (=290° K.)

and the relations are given by $$R=\frac{S_{02}/N_{02}}{S_{01}/N_{01}}=\frac{\zeta}{A_a\eta}$$

$$\zeta=\frac{S_{i_3}}{S_{i_1}}$$

and $$\eta=\frac{N_{02}}{N_{01}} \quad (13)$$

The total noise figure $F_T$ of the system is given by $$F_T=\frac{R}{\zeta}\left\{\left(\frac{T_e}{T_o}-1\right)+F_r\right\}\frac{T_o}{T_e} \quad (14)$$

Figure 7:
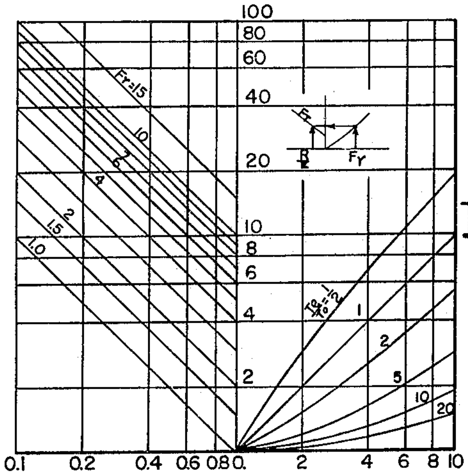
FIGURE 7 is a chart for determining the noise perforance parameters.

This relation is shown in the chart of FIGURE 7 for determining the noise performance parameter. The importance of R is that is tells directly the improvements of the noise figure of the system as a whole. In practice, the measurements of R and $F_r$ are sufficient to determine $F_a$ and $F_T$, providing $\zeta=1$ and $T_e$ is known.

The stability of the antenna-amplifier is treated for two cases: first, there is considered the static case, i.e., no field effects are taken into account. The antenna-amplifier, of course, should not show any unstable behavior with no field present. Secondly, there is considered the case when an antenna-amplifier is placed in an electromagnetic field. Since the dynamic range of present tunnel diodes is not very wide, care must be taken such that no strong signal which exceeds the dynamic range would exist in the area where the antenna-amplifier is intended to be used. However, it can happen that a signal would cause a shift in the bias point of the tunnel diode even when the signal strength is within the dynamic range. The variation of bias voltage and thus the negative conductance would affect the stability.

Besides the effect of signal strength, the effect of reflections from obstacles or the effect of coupling with other antenna elements will also affect the stability of the antenna-amplifier. These effects may change the antenna impedance which is interpreted to be the equivalent source impedance of the system.

In general, stable performance of a network is guaranteed by the condition $$g(p)=1/|f(p)|^2 \quad (15)$$

with $f(p)\neq 0$, for $\sigma>0$, where $f(p)$ is the voltage transfer function and $p=\sigma+jw$, the complex frequency function. This can be said to be a general stability criteria.

Based on Equation 15, the stable condition of the network shown in FIGURE 5 is given by $$f(p)=G_r+Y_{i1}\neq 0, \text{ for } \sigma>0 \quad (16)$$

As an alternate form, the driving point admittance of the network may be used for assessing stability; that is, if the real part of the driving point admittance at either input or output of the network is greater than zero, when the other port of the network is terminated by a passive impedance, the system can be said to be absolutely stable.

Figure 8:
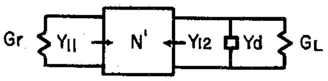
FIGURE 8 is another example of an equivalent network of the antenna-amplifier.

For example, using the network shown in FIGURE 8, the output admittance $Y_{A2}$ is given by $$Y_{A2}=Y'_{12}+Y_d \quad (17)$$

The total admittance including load conductance is then $$Y_{T2}=Y'_{12}+Y_d+G_L \quad (18)$$

It is clear that if $$Re(Y'_{12}+G_L+Yd)>0, \text{ for } \sigma>0 \quad (19)$$

the stability of the network will be assured.

Figure 9:
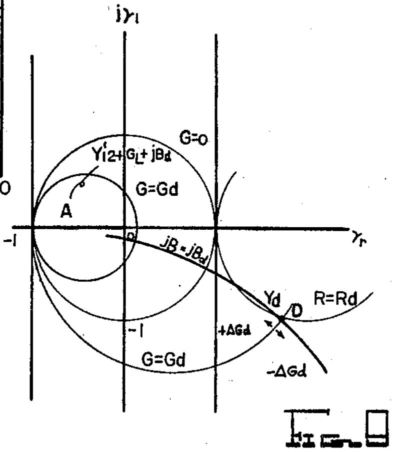
FIGURE 9 is an example for finding stability condition of the antenna-amplifier.

A graphical method may be applied to find the stability condition of the network because of the difficulty of a theoretical calculation of the stability condition. A modified Smith chart, which is extended to include the negative impedance and admittance region outside the unit circle is used. The chart outside the unit circle corresponds to a reflection coefficient, the absolute value of which is larger than unity. For convenience, impedance and admittance coordinates are super-imposed in the same chart. Since $Y_d$ and $Y'_{12}$ are measurable values, these can be plotted as shown in FIGURE 9, where $Y_d$ and the sum $$(Y'_{12}+G_L+jB_d)$$

are illustrated as point D and curve A, respectively. Based on the above criterion, the stable region of this network can be found for the portion of the curve A, which is located inside the circle of $G=+G_d$. The heavy line portion of curve A which is located outside the $G_d$ circle, including the $G_d$ circle, shows the unstable region.

Once the stability condition of the antenna-amplifier is obtained for no incident field, the effects of field upon the stability may be found by evaluating the sensitivity of the antenna-amplifier to a variation of negative resistance or antenna impedance.

First, the effect due to signal strength that will result in a change in negative conductance will be discussed. Using Equation 15 the stability condition may be written as $$f_{(p)}+\frac{\delta f_{(p)}}{\delta G_d}dG_d \neq 0, \text{ for } \sigma>0 \quad (20)$$

If the change in $G_d$ is small, Equation 20 can be written as $$f_{(p)}+\frac{\delta f_{(p)}}{\delta G_d}\Delta G_d \neq 0, \text{ for } \sigma>0 \quad (21)$$

Using the model shown in FIGURE 8, this condition is given by $$Y'_{12}+G_L+(Y_d-\Delta G_d)\neq 0, \text{ for } \sigma>0 \quad (22)$$

As shown before, the real part of the characteristic function should be positive for the network to be stable. Shifting the original function by the amount of $\Delta G_d$ should not make its real parts negative if the network is to remain stable. To visualize this condition, it is shown by means of FIGURE 9 that if the addition of $\pm\Delta G_d$ to the curve A shifts a portion of curve A outside the $+G_d$ circle, this portion becomes unstable and the rest of the curve remains stable. The same procedure may be applied to the other cases.

Next consider the case where the fields are disturbed by surrounding obstacles as shown in FIGURE 10*a*. In this case, the problem is quite involved in general because antenna impedance becomes more complicated, the radiation pattern is distorted and reradiation effects also may confuse the situation. Again, the negative resistance is likely to be changed by variation in the field strength. If this situation can be represented by a network structure, as in FIGURE 10, this would allow the case to be handled more easily. In FIGURE 10*b*, T is a transmitting antenna which is the source for the system, $N_A$ is an equivalent network representing the environmental field of the antenna-amplifier and the rest is an equivalent antenna-amplifier network. Now any change in the components outside the antenna-amplifier may appear as a change of admittance $Y_s$ seen looking away from the antenna-amplifier and thus $Y_r$ parallel to $Y_s$ appears to be changed. Therefore, for convenience, one assumes that the case can be treated as if the antenna-amplifier equivalent source admittance $Y_r$ were varied. In this case, the equivalent source $I_r$ for the antenna-amplifier may be kept constant. Changes of $G_d$ may be included in the above representation.

Now the characteristic function is given by $$f_{(p)}+\frac{\delta f_{(p)}}{\delta Y_r}dY_r+\frac{\delta f_{(p)}}{\delta G_d}dG_d\neq 0, \text{ for } \sigma>0 \quad (23)$$

or $$f_{(p)}+\frac{\delta f_{(p)}}{\delta Y_r}\Delta Y_r+\frac{\delta f_{(p)}}{\delta G_d}\Delta G_d\neq 0, \text{ for } \sigma>0 \quad (23b)$$

if the changes in $Y_r$ and $G_d$ are small.

It is much easier to use the chart for finding the stability condition rather than resort to theoretical calculations. In this case, the curve is shifted by changes in the parameters $Y_r$ and $G_d$. The procedure will be the same as the previous one, once $\Delta Y_r$ and $\Delta G_d$ are known. Consequently, the stability of an antenna-amplifier must be assured over a range of the parameters such as antenna admittance and negative conductance of the tunnel diode.

It must be noted that the influence of the variation in $Y_r$ or $G_d$ upon the gain cannot be neglected in the design of antenna-amplifier, even though the network remains stable. For example, fractional change in gain $g_T$ due to fractional change in antenna conductance $G_r$ is expressed, by using Equation 4, as $$\frac{\delta g_T}{\delta G_r}=-\frac{2G_t}{G_t}Re\left(\frac{1}{1+Y_{i_1}/G_r}\right) \quad (24)$$

Let sensitivity $S_r$ be defined as the ratio of $\delta g_T/g_T$ to $\delta G_r/G_r$. When $Y_{i_1}=G_{i_1}+j0=G_L-G_d$ and $G_{i_1}/G_r=X_1$, we have $$S_r=-\frac{2}{1+X_1} \quad (25)$$

When $G_r=Y_{i_1}$, we have $$\frac{\delta g_T}{\delta G_r}=-\frac{g_T}{G_r} \quad (26)$$

For variation in negative conductance $G_d$ of the tunnel diode the fractional again, for example in the network shown in FIGURE 8, is given by $$\frac{\delta g_T}{\delta G_d}=\frac{2g_T}{G_d}Re\left(\frac{G_d}{G_L+Y'_{i_2}+Y_d}\right) \quad (27)$$

In this case sensitivity $S_d$, similarly defined as above, is expressed by $$S_d=\phi\cdot\frac{2}{1+X_2}\left(\phi=\frac{G_d}{G_L}\right) \quad (28)$$

where $X_2=(G'_{i_2}-G_d)/G_L$, when $Y'_{i_2}=G_{i_2}+j0$. In FIGURE 11, a family of curves with parameter $\phi$ show $|S_r|$ and $|S_d|$. Equation 25 is shown as a heavy line with $\phi=1$ and a heavy dotted line for $-1<a<0$. Equation 28 is shown as a family of light curves with parameter $\phi$ and dotted lines are used for $-1<b<0$.

It is shown that sensitivity increases as $X_1$ or $X_2$ decreases. This corresponds to an increase in S as gain increases. Therefore, one must be extremely careful with the sensitivity of the gain to the variation in antenna admittance and tunnel diode negative conductance, when the gain is very high.

The current factor $\gamma_1$ is dependent on the thickness and spacing of the antenna elements in a $\pi$-match or H-type structure. At the the maximum value of $\gamma_1$, which is unity, the antenna structure becomes coaxial rather than two-wire, as FIGURE 13 shows, and the radiation current flows only on the dipole section and nonradiation current flows only on the coaxial section. The treatment is simpler than for the previous structures, and in practice coaxial sections of antenna can be made with a commercially available RF cable.

Examples of a practical model for each of the four types of antenna-amplifiers are shown in FIGURES 12(*a*), (*b*), (*c*), and (*d*).

Details of a practical tunnel diode dipole antenna-amplifier of the coaxial type are shown in FIGURE 13. This illustrates an embodiment of the methods and means described herein for integrating circuits and antenna into a unified system. The particular design illustrated in FIGURE 13 was tested at 420 mc. and was found to have a gain of about 5 db over the dipole without the tunnel diode. Noise figure of the antenna-amplifier was between 5 and 6 db. Theoretically, there is no limit to the gain of the antenna-amplifier in FIGURE 13 but present tunnel diodes would limit stable gain to about 10 db in a practical system.

In the constructed embodiment of FIGURE 13—corresponding to the coaxial-type dipole antenna of FIGURE 12*b*—comprised dipoles 10 and 11 horizontally positioned by baluns 12 and 13. To maintain the proper orientation of the radiating elements a spacer support 14 is tightly positioned over the baluns 12 and 13. The dipoles 10 and 11, as well as the baluns 12 and 13, are, in this embodiment, brass tubing. Adjacent the inner ends of dipoles 10 and 11, and positioned in the gap therebetween, is the tunnel diode circuit that forms the input signal amplifier. This tunnel diode circuit comprises tunnel diode 16 with its leads connected to the inner conductor 19 of dipole 11 and to the inner conductor 21 of dipole 10. The outside conductor 23 of dipole 11 is connected to the inner conductor 25 of feed line 15; whereas, the outer conductor 22 of dipole 10 is connected to the outside conductor 26 of the input feed line 15. These connections are made possible by extending the input feed line 15 through the wall of the balun 12 also positioned adjacent the gap between the dipoles 10 and 11.

There is illustrated in FIGURE 13*a*—in cross-section—the outer conductor 13 of dipole 11, the inner conductor 19 is shown in dotted line since it is covered by insulation 18. Shorting inner conductor 19 to the outer conductor of dipole 11 is the shorting bar 17. A duplicate and identical arrangement is provided for the shorting of the inner conductor to the outer conductor of dipole 10. The DC bias for the tunnel diode amplifier is fed directly by way of the inner conductor of the coaxial feed.

In order to control the impedance of the antenna to the line as well as the amplifier, as set forth above, the parameters of the antenna are varied. Calculations are given above that illustrate in the practical embodiment that the impedance may be controlled by varying the position of the shorting bars SB–1 and SB–2, the length of the coaxial conductors, diameter of the coaxial conductors, and the ratio of the inner to the outer conductors. In a practical embodiment of the H-type of antenna, as set forth above the spacing of the two elements may also be varied to control the impedance.

What is claimed is:

1. An integrated antenna-amplifier structure comprising a dipole antenna including a pair of elements having coaxial inner and outer conductors, said elements aligned in spaced relationship, a signal transmission line connected to said elements, a tunnel diode amplifier circuit having input and output terminals, means connecting said input and output terminals to said inner and outer conductors of said antenna at said spacing and means for controlling the impedance matching of said line to said antenna.

2. An integrated antenna-amplifier structure as set forth in claim 1 wherein one of said elements is continuous through both poles and said other element having a mid point spacing therebetween, said amplifier circuit is physically positioned in said discontinuance and electrically connected between said elements and said signal transmission line.

3. An integrated antenna-amplifier structure as set forth in claim 1 wherein said impedance matching means further comprises a pair of shorting bars shorting said coaxially aligned conductors at the ends of the inner conductors, and means for varying the position of said shorting bars.

4. An integrated antenna-amplifier structure as set forth in claim 1 wherein said impedance matching means is a function of the diameter of the coaxial conductors, their electrical length the ratio of the inner to the outer conductor and the position of the shorting bars.

5. The integrated antenna-amplifier structure as set forth in claim 1 wherein at least one of said elements having a mid point spacing therebetween, a transmission line, a tunnel diode amplifier circuit, connecting said elements to said line, said connection including connecting said tunnel diode across said mid point spacing.

6. An integrated antenna-amplifier structure as set forth in claim 1 wherein said terminals of said amplifier circuit electrically connect said outer dipole to said inner conductor elements of their outer ends and wherein said signal transmission line is coupled at the juncture of the poles of said dipole.

7. An integrated antenna-amplifier structure as set forth in claim 1 wherein each of said radiating elements has a mid point spacing therebetween, a solid state amplifier circuit having at least a pair of terminals connected across one of said elements at said mid point spacing, a transmission line, and means connecting said transmission line across the mid point spacing of said other element; a means for controlling impedance matching of said line to said antenna.

References Cited

UNITED STATES PATENTS

| | | | |
|---|---|---|---|
| 2,578,973 | 12/1951 | Hills | 343—701 |
| 3,098,973 | 7/1963 | Wickersham et al. | 343—701 |

ELI LIEBERMAN, Primary Examiner

U.S. Cl. X.R.

343—793, 822